United States Patent [19]

Fornaini

[11] Patent Number: 5,069,028
[45] Date of Patent: Dec. 3, 1991

[54] DECORATIVE CHAIN OF STAGGERED LINKS FORMED FROM BENT LAMINAR ELEMENTS

[75] Inventor: Domenico Fornaini, Arezzo, Italy

[73] Assignee: Uno-A-Erre Italia S.r.l., Florence, Italy

[21] Appl. No.: 540,147

[22] Filed: Jun. 19, 1990

[30] Foreign Application Priority Data

Jun. 21, 1989 [IT] Italy ................... 9455 A/89

[51] Int. Cl.$^5$ ............................................. F16G 15/14
[52] U.S. Cl. ........................................ 59/80; 59/82; 59/91
[58] Field of Search ............... 59/80, 91, 82, 13, 59/14, 15

[56] References Cited

U.S. PATENT DOCUMENTS

| | | | |
|---|---|---|---|
| 1,740,885 | 12/1929 | Augenstein | 59/80 |
| 1,962,037 | 6/1934 | Schofer | 59/80 |
| 2,324,241 | 7/1943 | Schoeninger | 59/91 |
| 2,400,591 | 5/1946 | Nanasi | 59/91 |
| 2,528,567 | 11/1950 | Williams | 59/80 |
| 2,574,125 | 11/1951 | Schoeninger | 59/82 |

FOREIGN PATENT DOCUMENTS

| | | | |
|---|---|---|---|
| 1078280 | 11/1954 | France | 59/91 |
| 1459252 | 10/1966 | France | 59/91 |

Primary Examiner—David Jones
Attorney, Agent, or Firm—Hopgood, Calimafde, Kalil, Blaustein & Judlowe

[57] ABSTRACT

Each of the links consists of a lamina (1) in the form of a strip which, by way of transverse bends (P1, P2), forms a flat link which is closed by way of pairs of tongues (10) abutting halfway through the thickness of the link, said pairs of tongues being spaced apart; the strip has two openings (3) centrally which border an articulation crosspiece (5) which they themselves form, as well as a lateral articulation extension (7) which is aligned with said articulation crosspiece (5), and each link is articulated to that adjacent to it by means of the pairs of abutting tongues (10) which engage on said articulation crosspiece (5) and on said lateral articulation extension (7), in order that each link is thus staggered in relation to those adjacent to it.

7 Claims, 2 Drawing Sheets

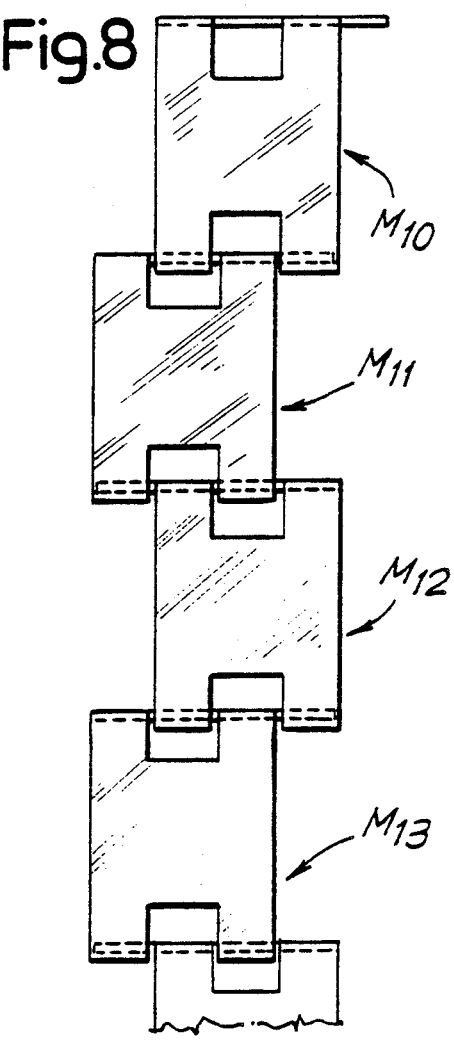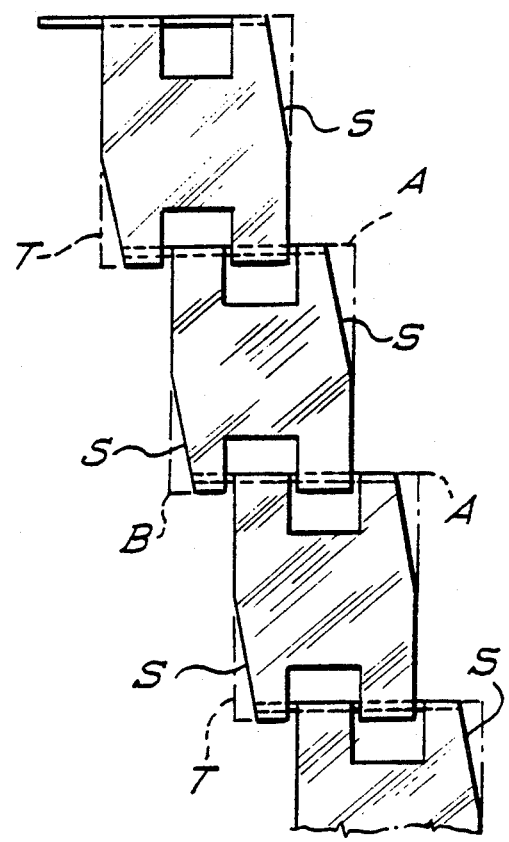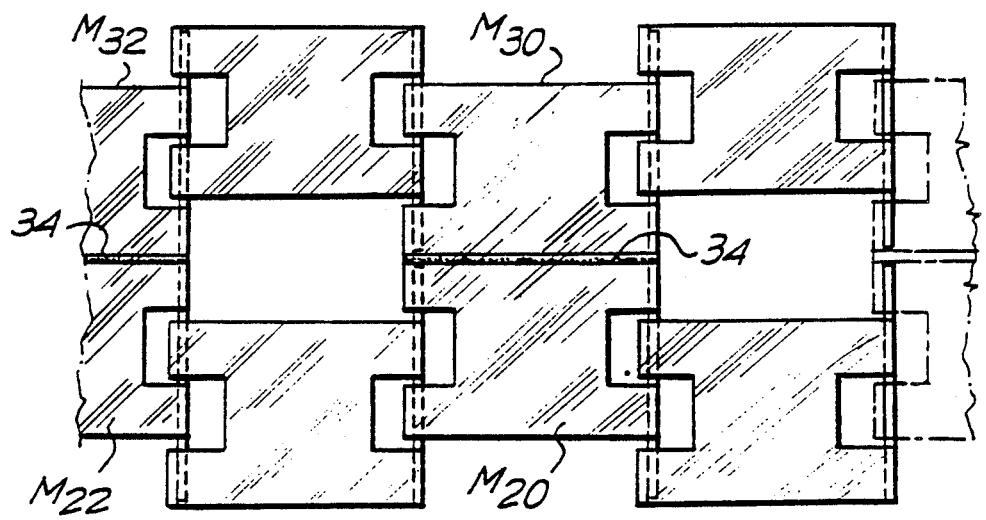

DECORATIVE CHAIN OF STAGGERED LINKS FORMED FROM BENT LAMINAR ELEMENTS

DESCRIPTION

The invention relates to a decorative chain which is of simple structure and easy to make and whose links are so shaped as to offer valuable and varied aesthetic qualities.

Essentially, in the decorative chain forming the subject of the invention, each of the links consists of a lamina in the form of a strip which, by means of transverse bends, forms an essentially flat link which is closed by means of pairs of tongues abutting halfway through the thickness of the link, said pairs of tongues being spaced apart; said strip has two openings centrally which border an articulation crosspiece which they themselves form, as well as a lateral articulation extension which is aligned with said articulation crosspiece; each link is articulated to that adjacent to it by means of the pairs of abutting tongues which engage on said articulation crosspiece and on said lateral articulation extension, in order that each link is thus staggered in relation to those adjacent to it.

The links can be developed with an essentially rectangular, or otherwise shaped, face and said face can be flat or molded.

Each link can be staggered in the same direction in relation to an adjacent link, or each link in an even position can be staggered in the same direction in relation to the links in an odd position.

The links projecting from one side can be connected to links projecting on the opposite side of a chain placed alongside, so as to form in this manner a double or multiple chain in the form of a mat.

The links, developed with an essentially rectangular face, can be chamfered along the two opposite sides adjacently to diagonally opposite corners, in order to create two discontinuous longitudinal edges which are slightly inclined in relation to the lines of articulation between the links.

The invention will be better understood by following the description and the attached drawing which shows a practical non-limitative exemplary embodiment of said invention. In the drawing:

FIG. 6 is a section, along VI—VI in FIG. 5;

FIGS. 7 and 8 show alternative embodiments in relation to FIG. 5, and

FIG. 9 shows two chains placed side by side and connected.

Figure 1:
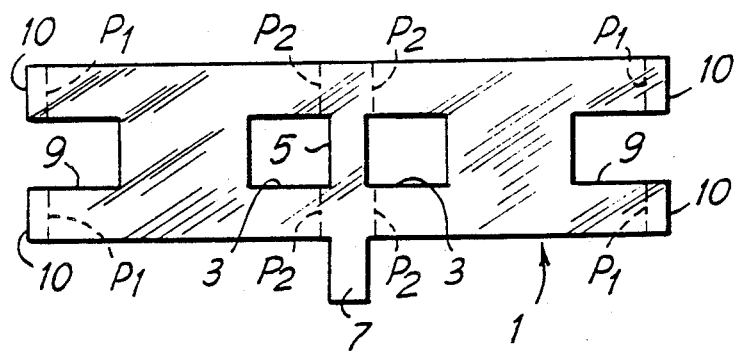
FIGS. 1, 2 and 3 show the development of a link in two views, and an intermediate stage of the production.
Figure 2:
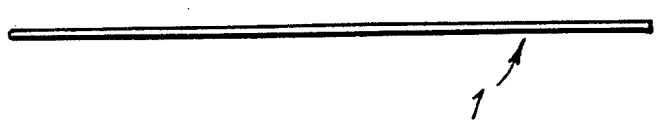
Figure 3:
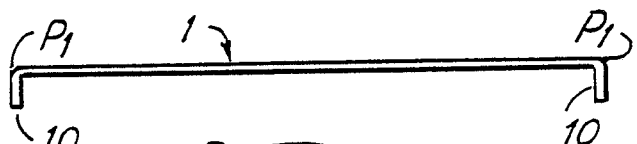
Figure 4:
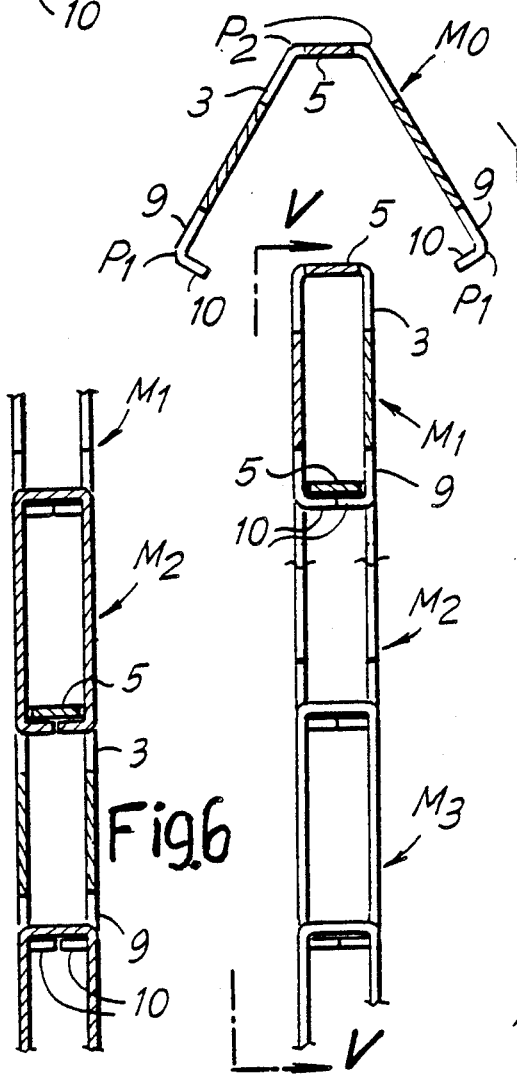
FIG. 4 shows a view and partial section of a chain in the process of formation.

According to what is illustrated in the attached drawing and with reference initially to FIGS. 1 and 2, the flattened development of a link consists of an elongate rectangular strip 1 which has two openings 3 centrally which are essentially symmetrical in relation to the median parallel to the short sides, so as to define between them an articulation crosspiece 5. A lateral extension 7, which projects from one of the two long sides of the strip, is provided as an external prolongation of the strip and of the articulation crosspiece 5. Towards the ends of the strip 1, two symmetrical recesses 9 are provided, which give rise to the formation of tongues 10 which are side by side and are spaced apart by virtue of the presence of said recesses 9. As shown in FIG. 3, the tongues 10 are bent perpendicularly to themselves along the bending lines P1. The link is further elaborated, for application, by means of the formation of two bends along two transverse lines P2 in the area of the articulation crosspiece 5 and of the articulation extension 7; consequently an open link shape M0, as shown in the top part of FIG. 4, is brought about, this shape being obtained by means of the partial bending along the two lines P2. By completing the bending along the lines P2, the link closes, bringing the opposite pairs of tongues 10 together and engaging them by means of the openings 3 on the extension 5 of an adjacent link M1 as well as on the extension 7 of said link M1. By these means, engagement is brought about between successive links which are staggered as is clearly visible in the relative position of the links M0, M1, M2 etc. in FIG. 5. The articulation between two links is determined by the articulation crosspiece 5 and by the articulation extension 7 and by the eyelets formed by means of the bringing together of the two tongues of the pairs of mutually abutting tongues 10 which can be soldered to one another in known manner in the interspace determined between them.

A link, obtained fundamentally in the manner indicated above and having the simplified geometry illustrated in FIGS. 1 to 4, can be modified in its external shape by means of a modification of the profile and/or the depth and/or the width of the openings 3 and of the recesses 9, or of the external edges of the long sides of the strip 1 forming each link, or by means of other adaptations of esthetic nature.

Figure 5:
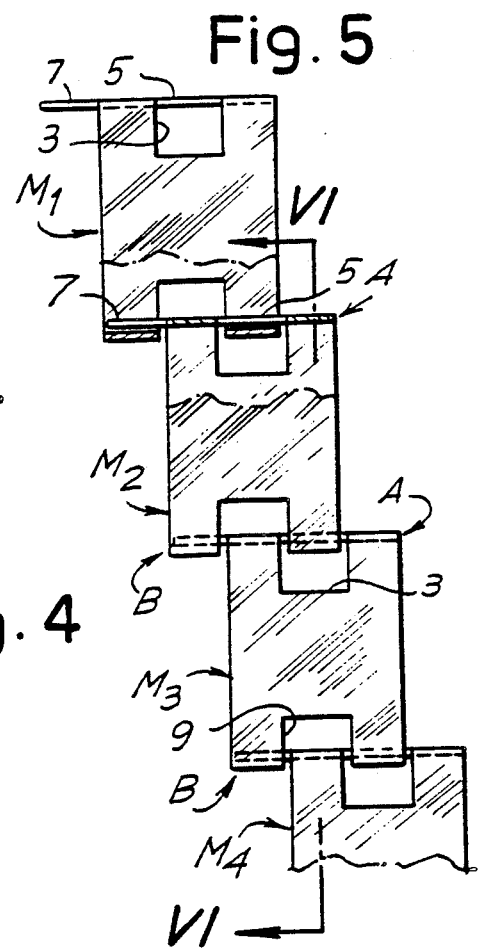
FIG. 5 is a front view along the line V—V in FIG. 4.

The links produced in the manner indicated above can be connected to one another—by means of the principles explained above—in different ways and in particular in the two fundamental forms shown in FIG. 5 and in FIG. 7.

In FIG. 5, the various links such as M0, M1, M2 etc. are each assembled staggered in the same direction in relation to that preceding, the result of which is a chain which is inclined in relation to the direction of the articulations determined by the crosspieces 5 and by the extensions 7. The arrangement according to FIG. 5 can be modified—for the most part by means of working subsequent to the assembly of the chain—by chamfering the diametrically opposite corners of the links, which are indicated by A and B and have a rectangular shape in the front view in FIG. 5, and by chamfering the sides of the link. In this manner the chain is given a shape essentially of the type shown in FIG. 7, in which broken lines T indicate the areas which have been removed and give rise to the formation of chamfered areas S which contribute to the formation of a chain which has chamfered corners in relation to that shown in FIG. 5 and articulations (obtained from the crosspieces 5 and the extensions 7) which are inclined in relation to the course of the lines of chamfering S of the links.

In FIG. 8, a different form of assembly of the links of the chain, which have already been described, is shown, the successive links M10, M11, M12, M13 etc. being assembled staggered alternatively on one side and on the other, the links in an even position M10, M12 etc. thus in essence being staggered in the same direction in relation to the links M11, M13 etc. in an odd position. In this form of assembly, the articulations are perpendicular to the general course of the chain, in contrast to the solution in FIGS. 5 and 6 in which the articulations are slightly inclined in relation to the course of the chain.

In FIG. 9, a double chain is shown, that is to say one obtained by means of the combination of two single chains such as that shown in FIG. 8. In this case, corresponding links such as M20 and M30 as well as M22 and M32 project in opposite directions and are connected to one another, for example by means of soldering as is shown at 34 in said FIG. 9. This arrangement can also be adopted for three or more single chains. A similar arrangement could also be envisaged for double or multiple chains of the type shown in FIG. 7, when the chamfered areas S on the same side of a chain are perfectly aligned and parallel with one another. In this case, two or more chains placed side by side can be connected to one another along the lines of chamfering S which correspond in the two chains.

I claim:

1. A decorative chain comprising:
   an assembly of links, wherein each said link consists of a bent lamina formed from a strip having bends formed along said strip transverse to the longitudinal extent of said link, each said link having
   a thickness and first and second ends,
   a pair of abutting tongues disposed at said first end and an articulation crosspiece disposed at said second end,
   an opening formed adjacent said first and second ends, and a lateral articulation extension extending laterally from and aligned with said articulation crosspiece, and
   each said link being articulated to an adjacent said link by means of said pair of abutting tongues which engage on said articulation crosspiece and on said lateral articulation extension of said adjacent link, so that each said link is staggered laterally in the same direction in relation to said adjacent link.

2. The decorative chain according to claim 1, wherein each said link has an essentially rectangular geometry.

3. The decorative chain according to claim 1, wherein each said link has a pair of opposing sides, each having an essentially rectangular face having opposing side edges and opposing corners, and wherein said opposing side edges are chamfered along said opposing side edges in order to create a pair of discontinuous longitudinal edges which are slightly inclined to the lines of articulation between said links.

4. A decorative chain comprising:
   an assembly of links, each said link being disposed in either an even or odd position along said assembly, wherein each said link consists of a bent lamina formed from a strip having bends formed along said strip transverse to the longitudinal extent of said link, each said link having
   a thickness and first and second ends,
   a pair of abutting tongues disposed at said first end and an articulation crosspiece disposed at said second end,
   an opening formed adjacent said first and second ends, and a lateral articulation extension extending laterally from and aligned with said articulation crosspiece, and
   each said link being articulated to an adjacent said link by means of said pair of abutting tongues which engage n said articulation crosspiece and one said lateral articulation extension of said adjacent link, so that each said link in an even position is staggered laterally in the same direction in relation to said links in an odd position.

5. The decorative chain according to claim 4, wherein each said link has an essentially rectangular geometry.

6. The decorative chain according to claim 4, wherein each said link has a pair of opposing sides, each having an essentially rectangular face having opposing side edges and opposing corners, and wherein said opposing side edges are chamfered along said opposing side edges in order to create a pair of discontinuous longitudinal edges which are slightly inclined to the lines of articulation between said links.

7. The decorative chain as claimed in claim 4, which further comprises another said decorative chain placed alongside of said decorative chain, and wherein said links of said decorative chain which are staggered in said same direction project from one side of said decorative chain and are articulated to links of said another decorative chain which are staggered int he same direction and project from the opposite side of said another decorative chain.

* * * * *